Jan. 21, 1947.  A. POULSEN ET AL  2,414,666
PHOTOGRAPHIC SOUND FILM NOISE REDUCTION SYSTEM
Filed Sept. 17, 1931  2 Sheets-Sheet 1
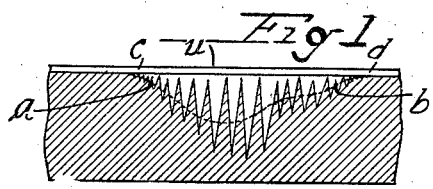
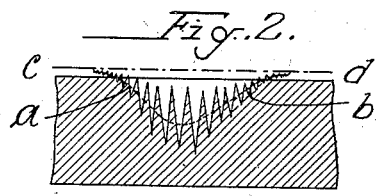
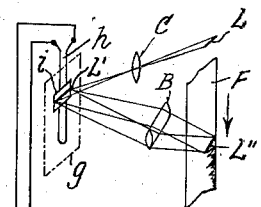
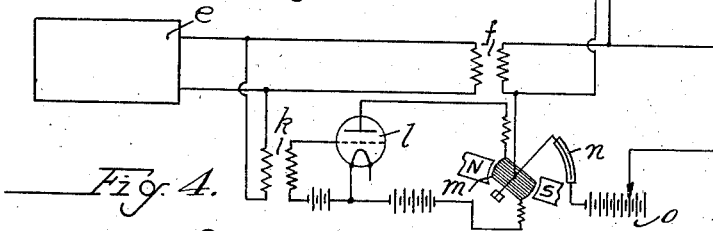
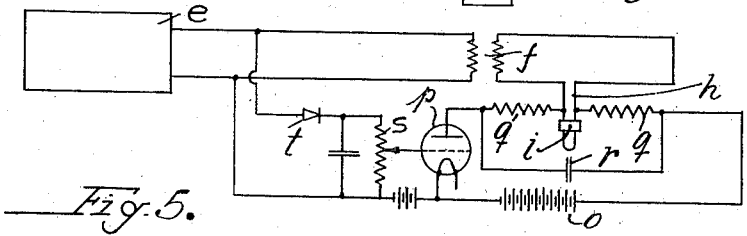
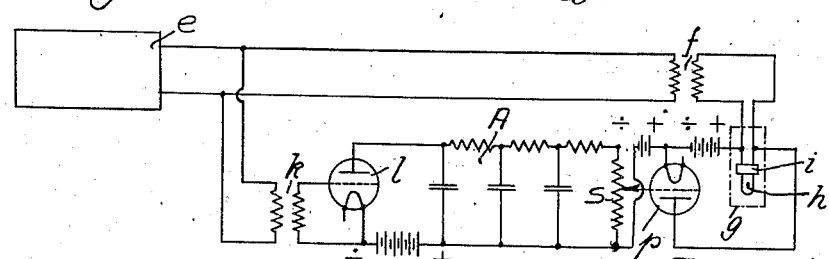
Inventors:
Arnold Poulsen and
Axel Carl Georg Petersen
By Emil Bomelyke Attorney Jan. 21, 1947.  A. POULSEN ET AL  2,414,666
PHOTOGRAPHIC SOUND FILM NOISE REDUCTION SYSTEM
Filed Sept. 17, 1931  2 Sheets-Sheet 2.

Inventors:
Arnold Poulsen and
Axel Carl Georg Petersen
By Emil Bonnelycke
Attorney Patented Jan. 21, 1947

2,414,666

UNITED STATES PATENT OFFICE 2,414,666

PHOTOGRAPHIC SOUND FILM NOISE REDUCTION SYSTEM

Arnold Poulsen, Hellerup, and Axel Carl Georg Petersen, Copenhagen, Denmark, assignors to British Acoustic Films Limited, London, England, a British corporation Application September 17, 1931, Serial No. 563,447
In Germany September 26, 1930

15 Claims. (Cl. 179—100.3)

This invention relates to new and useful methods and systems for producing photographic sound records of the kind in which the sound to be recorded is first converted into an alternating current to control a sound recording device, from which a light beam is directed onto a film to form thereon a transversely disposed extremely narrow strip of light, the length or intensity of the strip of light being varied by said current about an average value in accordance with the amplitude of the individual sound waves.

Irregularities and scratches in the transparent portion of a sound film cause during the reproduction of the sounds a disturbing noise, the so-called "background noise." In order to avoid this noise it has previously been proposed to actuate the sound recording device not only by the above mentioned alternating current, i. e., a sound responsive current, but also by a direct current, which is influenced by a rectified portion of the sound responsive current so as to cause the average length or average intensity of the light strip formed on the film to vary (dependent upon the volume of the sound), whereby on the sound reproducing film prepared from the original sound record the mean transparency of the sound track decreases when the volume of the recorded sound decreases. The product is a so-called "noiseless sound record."

In order to avoid distortion in the reproduced sounds care must be taken that in the production of sound records of the variable width or of the variable density type that the variation of the average length or the average density of the said strip of light does not exceed a value which is equal to the difference between the value of the length or intensity of the light-strip during silent periods and a value corresponding to 50% blackening of a transversal element of the sound track. Otherwise the length or intensity of the light strip would, when the volume of the sound is at a maximum, partly pass outside the range within which it would have to be kept for the maximum width or for the maximum degree of modulation of the exposure, respectively, of the sound track.

One object of the present invention is to insure that the variations of the average length or intensity of the strip of light formed on the film is not allowed to exceed a predetermined value. In order to attain this object, the direct current actuating the sound recording device to cause said variations is adjusted to such magnitude that it attains zero value when the volume of the sound to be recorded, or more precisely, when the magnitude of the sound responsive current reaches a predetermined arbitrary maximum value corresponding to maximum volume of the sound or some volume less than the maximum.

In a method of producing a sound record of the variable width constant density type the said direct current and the sound recording device are so adjusted that when the sound responsive current is zero or of a minimum value, the direct current maintains the sound recording device in such position that the zero line of the sound track is located near to (either inside or just outside) one edge of the sound track, whereas when the direct current is zero, the zero line of the recorded sound is displaced to a position on or near the center line of the sound track.

In methods of producing sound records of the variable density constant width type the said sound recording device is so adjusted that the intensity of the light impinging on the film is of a value corresponding to a degree of exposure of 50% or approximately 50% of the film when the direct current controlling the average intensity of the light is zero.

The direct current above referred to may be the plate current of a thermionic tube. The grid bias of this tube is varied by the rectified portion of the sound responsive current.

In producing noiseless sound records the average transparency of the original, or negative, record has hitherto been caused to increase when the volume of the sound decreases in order that on a positive record copied from the negative record the transparency should decrease when the amplitude of the recorded variations decreases.

A further object of the present invention is to produce an original sound record of the variable width or of the variable density type, on which the average value of the transparency of the sound track varies inversely to the volume of the sounds to be recorded.

The original sound record produced by this modification of the invention has the advantage over known types of original records (in which silence is represented by transparency) that copies to be used for reproducing (in which silence is represented by opacity) can be made from it by a process involving two stages only; (1) preparation by printing of a copy in which silence is represented by transparency, and (2), the printing from this copy of the actual reproducing copies. The first will, of course, acquire during use blemishes such as scratches, which will be represented as transparent spots or lines in the reproducing copies. However, any number of these first copies, all initially equally free from blemishes, can be made from the original record, because scratches and specks of dust on this original record, which is for the most part opaque, will not appear in these copies. If in the original record silence were represented by transparency, this method of making reproducing copies would involve one extra copying operation, namely, the preparation of a "master" positive (in which silence is represented by opacity) by printing from the original record, and the opaque parts of this "master" copy would have imprinted thereon the blemishes in the transparent part of the original record. Thus, assuming the most favorable conditions in each case in the making of the reproducing copies, the present invention ensures greater freedom from blemishes giving rise to background noise than the processes hitherto proposed.

A variation of the average transparency of the sound track corresponding to an increase of the volume of the sound should appear as quickly as possible in order that the peaks of the amplitudes of the recorded variation representing the first waves of the sound of increased volume should not be cut off. This might happen because the peaks extend outside the border line of the sound track of a variable width record, and will not happen if the zero line is shifted quickly. On the other hand, when the volume of the sound decreases, the zero line should not be shifted too quickly towards the border line, because then the sound might be suddenly cut off.

It is a further object of the invention to eliminate these defects and, to this end, the variation of the average length or intensity of the strip of light formed on the film is caused to take place more rapidly than or as quickly as the corresponding variation in the volume of the sound when the sound increases, and is caused to vary more slowly than the volume of the sound when the sound decreases.

A sound produced suddenly after a pause, as most sounds are, will cause the occurrence of a corresponding displacement of the working point as quickly as, or more quickly than the increase of the magnitude of the sound amplitude in question, the displacement taking place away from the position occupied by the working point during the pause. Usually this last mentioned position corresponds to full blackening of the sound record track.

The sound in question will, therefore, be recorded with certainty, and when a sound dies slowly away the density will vary so slowly that it cannot reach the maximum value during the pauses before the audible oscillations to be recorded have ceased.

This adjustment of the system serving to govern a sound recording member can be attained by the mutual adjustment of the coefficients of conductivity of the circuit or of one or more of the circuits through which the rectified current is transferred to or is caused to actuate the sound-recording member, in such a manner that the variations in the rectified current are effected more quickly when the said current increases than when it decreases.

Preferably, a rectifier valve is used for rectification. The last mentioned control may be effected by inserting in the well-known manner in the anode circuit of the rectifier valve a smoothing condenser connected in parallel to an ohmic resistance. This resistance is so adjusted (depending on the ohmic resistance of the rectifier valve), that the charging of the condenser during the passage of a positive half wave through the rectifier valve will be effected more quickly than the subsequent discharge of the condenser during the occurrence of a negative half wave.

In order that the invention may be clearly understood and readily carried into effect, some examples of the same will now be described with reference to the accompanying drawings, in which:

Figure 1 shows a portion of a sound film of the variable-width type produced in accordance with the present invention;

Fig. 2 shows a portion of a film having the zero line situated beyond the edge of the film;

Fig. 3 is a diagram of the connections of a system for producing the displacement on the film of the zero line of the crests and troughs of the sound record, in accordance with the present invention;

Fig. 4 is a diagram of connections of a modified form of such a system;

Fig. 5 is a diagram of connections of a third form of system adapted to displace the zero line during the recording to the sound;

Figure 6:
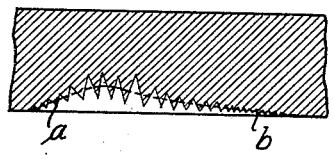
Fig. 6 shows a portion of a positive film with sound record according to the transversal method and with a zero-line displacement increasing at the same rate as the amplitudes.

Figure 1 shows a portion of a sound record of a known kind on which the distance between one edge $u$ of the sound track and the zero line of the trace of the recorded sound waves, indicated by the dotted line $a, b$, increases as the volume of the recorded sound increases. When the volume of the sound to be registered is at a maximum, the distance between the edge $u$ of the sound track and the zero line $a, b$, is equal to half the width of the sound track, so that the zero line coincides with the center line of the sound track, when the volume of the recorded sound is at a maximum.

The distance between the edge $u$ of the sound track and the zero line $a, b$, is varied during the recording by displacement of the zero line transversely in relation to the record. This displacement is caused by means of a unidirectional current which is modified by a rectified portion of the sound-responsive current and actuates the recording means, so as to alter the mean position about which the said means vibrates due to the sound-responsive current. This will be more fully understood from the description set forth below in connection with Figs. 3 to 5.

In the known methods of producing sound records, the unidirectional or biasing current increases as the volume of the sound increases. Under certain circumstances this may cause the transverse displacement of the zero line from a position near the edge of the sound track to exceed half the width of the sound track, viz. if the volume of the sound exceeds a predetermined maximum value. This causes distortion of the sounds reproduced from the record, because the peaks or the troughs of the sound wave are not recorded when the distance between the zero line $a$, $b$ and the edge $u$ of the sound track is greater than half the width of the sound track. This happens if the zero line $a$, $b$ during its displacement passes beyond the center line of the track. In order to avoid this, we control the displacement of the zero line $a$, $b$ by a unidirectional current which is reduced as the volume of the sound increases, so as to attain zero-value when the volume of the sound is at a maximum. The recording means is adjusted to such a position relatively to the record that, when the unidirectional current is zero, the zero line $a$, $b$ of the recorded waves coincides with the center line of the sound track. When the volume of the sound decreases the unidirectional current is increased and causes the zero line $a$, $b$ to move toward an initial position. This is the position occupied by the zero line when no sounds are to be recorded, and it either coincides with the edge $u$ of the sound track, or is located either slightly inside the edge $u$ of the sound track, as at $c$, $d$ in Fig. 1, or preferably slightly outside the edge $u$ as indicated by the line $c$, $d$ in Fig. 2.

The records shown in Figs. 1 and 2 are supposed to be records suitable for use in the sound reproducing apparatus and the cross-hatched areas of the records represent the exposed or opaque portions of same. These records are produced by a double copying process from a corresponding original negative record.

Fig. 3 shows a system for varying the position of the zero line of a sound-recording apparatus in the manner described above.

The current into which the sounds are converted is passed through an amplifier $e$ and a transformer $f$ to the sound-recording apparatus $g$, which, in the construction shown, is assumed to be an oscillograph with a wire loop $h$ carrying a mirror $i$. The primary winding of a transformer $k$ is connected in parallel with the primary winding of the transformer $f$ and the secondary winding of the transformer $k$ is included in the grid circuit of a thermionic valve $l$ in which the secondary current of the transformer $k$ is rectified. The rectified current serves to actuate a polarized electromagnetic relay $m$, although an electrodynamic relay may obviously be used instead. $n$ is a variable resistance consisting of a liquid in a tube of narrow cross-section and varied by the relay $m$ in such a manner that the ohmic resistance between the terminals of the tube is increased with the increase in the said rectified current. The resistance $n$ and a battery $o$ in series with it are connected in parallel with the secondary winding of the transformer $f$. The battery $o$ will thus deliver a current passing through the resistance $n$ and the wire loop $h$ of the oscillograph.

The mechanical inertia of the relay $m$ will be, as a rule, sufficient to smooth out the pulsations of the rectified current, but these pulsations may also be removed by other means, for example, by a filter. The current passing through the resistance $n$ so actuates the oscillating system, consisting of the mirror $i$ and the loop of the oscillograph as to alter the zero position of the latter. The alternating current passing through the transformer $f$ to the wire loop thus causes the said system to oscillate about a zero line, the position of which depends on the current passing at any time through the battery $o$, the resistance $n$ and the loop $h$.

The adjustment of this device is effected in the following manner:

The moving system $h$ of the oscillograph is mechanically set so that the zero line of the sound trace lies along the center line of the sound track, the circuit of battery $o$ having been interrupted. Then the transformer $k$ is disconnected and an alternating current is passed through the amplifier $e$ at such a constant amplitude as to be equivalent to the maximum amplitude of the currents representing the sounds to be recorded. The circuit is then adjusted so that the trace on the record representing the steady alternating current is of the full width of the sound track. The transformer $f$ is next disconnected and the transformer $k$ connected. The voltage of the battery $o$ is then adjusted without any current flowing in the amplifier $e$ so that the moving system $h$ of the oscillograph is deflected until the extreme end of the line of light on the film takes up the position of extreme peaks of the waves caused by the alternating current of constant amplitude through the transformer $f$ mentioned above. Finally, with no current flowing through the oscillograph loop $h$, the zero position, corresponding to the center line of the sound track is again checked, or if necessary readjusted mechanically. The electrical resistance of the oscillograph loop $h$ is in practice very small in comparison with the resistance of the liquid in the tube $n$ so that proportionality is obtained between the direct and alternating currents passing through the loop.

During periods of silence the only factor operating is the battery $o$ and the end of the line of light will be shifted to a point at or near the edge of the sound track as shown at $c$, $d$ in Fig. 1, or just outside the sound track as shown in Fig. 2. Sound oscillations cause oscillations of the loop $h$ depending upon their amplitude. The rectified current, also depending upon the amplitude of the oscillations, passes through the instrument $m$ and increases the resistance $n$ and decreases the current from the battery $o$ in proportion to the amplitude of the sound waves. When the latter are of maximum value the resistance is so great that substantially no current flows from the battery $o$ and the zero line $a$, $b$ of the sound trace is at the center line of the sound track.

Instead of an oscillograph with an oscillating mirror any other suitable recording apparatus may be used for recording, provided that the neutral position can be varied by the action of a direct current. For example a glow-lamp oscillograph may be used in which the length of the luminous portion of the discharge is regulated by the alternating currents corresponding to the sounds and also by a direct current voltage which is controlled in the same manner as the above-mentioned direct current.

In the arrangement shown in Fig. 4, the relay $m$ is replaced by a thermionic valve $p$, the anode circuit of which includes the wire loop $h$ of the oscillograph and two resistances $q$, arranged in series, and placed one on each side of the wire loop. The wire loop and the resistances are shunted by a condenser $r$. The object of this arrangement is to prevent currents of acoustic frequencies in the anode circuit from affecting the oscillating system of the oscillograph.

The output circuit of the amplifier $e$ contains a potentiometer resistance $s$ and a rectifier $t$ of suitable type, and the variable portion of the resistance $s$ is connected between the grid and cathode of the valve $p$. The anode current of the valve $p$ is the unidirectional current, referred to above. As in Fig. 3, a portion of the sound-responsive current in the output circuit of the amplifier $e$ is rectified by the rectifier $t$, and the rectified current flows through the resistance $s$ and produces variations of the grid bias of the valve $p$ in accordance with the effective value of the rectified current and, consequently, in accordance with the volume of the sound. The variations of the grid potential of the valve $p$ cause corresponding variations of the anode current of the valve, whereby the above-mentioned variations are produced in the position about which the loop and the mirror $i$ are caused to vibrate by the action of the sound-responsive current in the secondary winding of the transformer $f$.

The adjustment of this device is effected in the following manner:

As in connection with Fig. 3, the end of the line of light is set to the middle of the sound track by mechanical setting of the moving system $h$ of the oscillograph with no current flowing in the system. Then the rectifier $t$ is disconnected as before, and an alternating current of constant amplitude corresponding to the maximum amplitude of sound to be recorded is applied to the amplifier $e$ and the circuit adjusted so that the end of the line of light rests on the line $c$, $d$ as shown in Fig. 1 or Fig. 2. The alternating current is then switched off from the amplifier $e$ and the bias battery of the valve $p$ adjusted so that its grid bias potential allows a direct current to pass from the battery $o$ through the anode circuit of the valve $p$ and through the oscillograph loop $h$ with just sufficient magnitude to bring the end of the line of light again to the line $c$, $d$ in Fig. 1 or Fig. 2. Then, without reconnecting the transformer $f$, the rectifier $t$ is again brought into circuit and alternating current of the same constant amplitude as before is applied to the amplifier $e$. The resistance $s$ is then adjusted in order to vary the amplification due to the valve $p$ until, with the alternating current mentioned flowing in the amplifier $e$, the current from the battery $o$ is reduced to zero. This is indicated by the fact that the oscillograph moves the end of the line of light on the film back to the center line of the sound track. The moving system of the oscillograph may be reset again with no current flowing until the zero line occupies the center of the sound track. It will be evident that, if the system is adjusted in the manner described above, the zero line of the recorded waves would never be displaced further than up to the center line.

The system shown in Fig. 5 differs from the form shown in Fig. 4 mainly in that the rectifier $t$ is replaced by a transformer $k$ and a rectifying valve $l$. The primary winding of the transformer $k$ is connected across the output circuit of the amplifier $e$ and the secondary winding of the transformer $k$ is connected between the grid and the cathode of the valve $l$. The valve $l$ rectifies the current in the secondary circuit of the transformer $k$, and the rectified current is smoothed by a filter A in the plate circuit of the said valve. This circuit includes, in addition, the resistance or potentiometer $s$ which is connected between the grid and the cathode of the valve $p$. The rectified and smoothed current in the anode circuit A of the tube $l$ produces voltage variations in the resistance $s$ and thus reduces the negative grid-bias potential as it itself increases. When the resulting grid-bias potential reaches a value at which the anode current of the valve $p$ becomes zero, and the zero line is consequently moved to the center line of the sound track then, a further increase of the said voltage variations, that is to say, a still more powerful impulse through the transformer $k$, will cause no further alteration of the anode current and, consequently, no further displacement of the zero line. As a result, the zero line cannot be displaced during recording beyond the center line of the film.

It will be noted that the valve $p$, shown in Figs. 4 and 5, constitutes a separate amplifier or modulating device for the unidirectional current and is separate from any part of the amplifier $e$ used for amplifying the sound-responsive current which flows through the oscillograph loop $h$.

In the above, the recording apparatus is assumed to be an oscillograph; it is, however, within the scope of the invention to use any other sound recording apparatus adapted for recording sounds and sound oscillations according to the variable-width method.

In practice, good results have been obtained with the circuit shown in Fig. 4 where the resistance of the rectifier $t$ was 10,000 ohms, the resistance of S 200,000 ohms, and the capacitance of the condenser bridged across S, 0.1 microfarad.

With the circuit shown in Fig. 5, good results were obtained with the constants chosen as follows: The resistances of the first two resistances connected with the plate of the rectifier, each 100,000 ohms, and of the third resistance in series therewith 150,000 ohms, the resistance of S 200,000 ohms, and the capacitance of the condensers bridged across the output circuit, of the rectifier 0.15 microfarad of the condenser immediately following the rectifier 1, and 0.1 microfarad of each of the other two condensers.

While it is rather complicated to calculate the time constants of the circuit on the rise and on the fall of the rectified current, we have measured the time it takes for the bias current to fall to zero at increasing sound volume and the time it takes to reach its normal value at decreasing sound volume. We have found that it takes 5 milliseconds for the bias current to fall to zero and 40 milliseconds for the bias current to increase to normal value. These values were found, in the first case by suddenly applying an A. C. to the microphone amplifier of an intensity corresponding to a full amplitude on the film and, in the second case by suddenly interrupting the A. C. In practice the sound does not start with full amplitude and 5 milliseconds will be a sufficiently short time to avoid imperfect recording.

Figure 6 shows a portion of a film on which the sound record is made according to the transversal method, the zero-line $a$, $b$ being displaced inward from the edge of the film towards the centre thereof, in such a manner that the speed at which this displacement is effected is essentially the same as the one at which the variations in the sound amplitudes are effected, being for instance proportional to the last mentioned speed.

Figure 7:
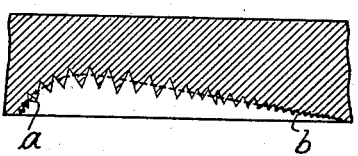
Fig. 7 shows a portion of a positive film on which the displacement of the zero-line of the sound record can be effected more quickly at increasing amplitudes than the variation in amplitudes, and more slowly than the variations in the same at decreasing sound amplitudes.

In Figure 7 a portion of a film is shown on which the zero-line, at the commencement of the sound, is displaced faster than the amplitude of oscillation is increasing, cf. the left-hand side of the sound record in Figure 7, and at the cessation or decrease of the sound record is moved back more slowly than the decrease of the amplitude of oscillation, cf. the right-hand side of the sound record in Figure 7.

Figure 8:
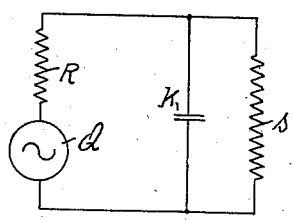
Fig. 8 shows a simplified diagram of the anode circuit in a rectifier valve used in the system used in Fig. 5.

The zero-line $a$—$b$ may be considered a graphical representation of the curve-shape of the rectified current in the system shown in Figure 5, as it will practically be of the same shape as the said curve. The curve-shape of the rectified current will depend on the constants in the anode circuit of the valve $l$. A diagram of this circuit is shown in Figure 8, where the valve $l$, which is to be considered a source of current with a certain internal resistance, is replaced by an alternating current source Q and a resistance R, which represents the internal resistance of the valve $l$. During the positive half wave of the alternating current the resistance R will have another mean value than during the negative half wave, as it will practically be infinitely great during the occurrence of the last mentioned half wave. Therefore the condenser K will be charged through the resistance R during the occurrence of the positive half wave, and discharged through the resistance $s$ during the occurrence of the negative half wave.

Figure 9:
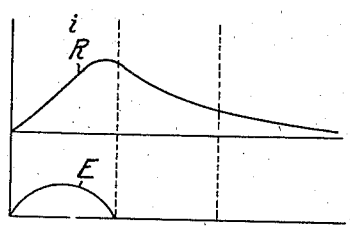
Fig. 9 shows, graphically, the course of the rectified current used for governing the recording member, during the passage of a positive half wave through the anode circuit shown in Fig. 8, and the subsequent discharge of the condenser in this circuit.

Assuming for the sake of simplicity that the anode circuit is only actuated by one single oscillation, the variation of the voltage across the resistance $s$ will be represented by the curve E in Figure 9. Disregarding the influence of the resistance $s$ on the time constant for the anode circuit during the charging of the condenser K, which may be done with great approximation provided that the resistance $s$ is proportionally as great as the resistance R and the capacity of the condenser K, the time constant for the anode circuit will be expressed by the product R.K during the charging and by the product K.$s$ during the discharge, which latter is effected solely across the resistance $s$. It will be seen that by variation of the values of the resistance $s$ and the condenser K relatively to the internal resistance R of the valve $l$, the curve-shape for the rectified current $i_R$, Figure 9, can be modified in such a manner that it will assume the shape or approximately the shape indicated by the zero-line $a$—$b$ in Figure 7, cf. the full-line curve for the current $i_R$, Figure 9.

If the frequency of the alternating current is high, viz. so high that the duration of the period is short in comparison to the time of charging and discharging for the condenser K, the rectified current will be practically completely equalized. If, on the other hand, the frequencies of the alternating current are low, and the duration of the alternating-current period is of the same order of magnitude as the charging and discharging times for the condenser K, difficulties will be created in equalizing by means of the resistance $s$. If the equalization is imperfect the rectified current will have an alternating-current component, which not only may cause an amplification or a weakening of the frequency concerned, but also may introduce higher harmonics. If we attempt to remedy this drawback by making the time constant K.$s$ very great, or by inserting several filters in series, the difficulty will be created that the time of discharge of the condenser K, after the oscillations have ceased entirely, will be very long, the consequence being that the zero-line will not return to its initial position until a long time after the sound has ceased, or will not return to its initial position at all until the next sound has commenced. The sound pauses will therefore not be noiseless.

Figure 10:
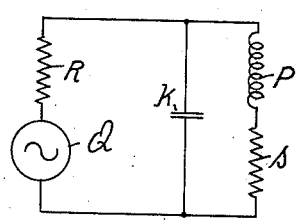
Fig. 10 shows a modified construction of the anode circuit shown in Fig. 8.
Figure 11:
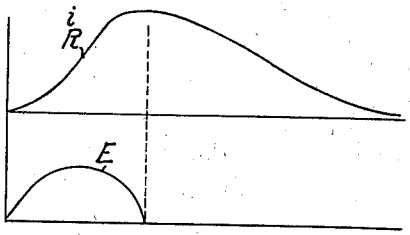
Fig. 11 shows the course of the rectified current in the circuit shown in Fig. 10.

The last mentioned drawback may suitably be remedied by the insertion of a self-induction P in series with the resistance $s$, as shown in Fig. 10. The self-induction will then flatten the first part of the discharge curve of the condenser K, as shown in Fig. 11, that is to say the filter effect will be improved, without increasing the time of discharge.

Figure 12:
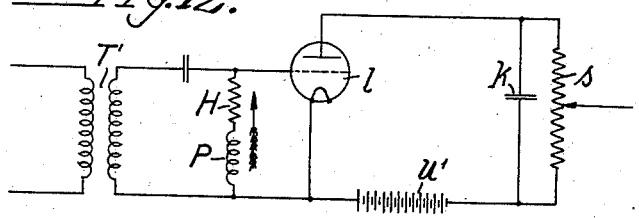
Fig. 12 shows the wiring diagram of an amplifier stage for the rectifier constructed according to the invention.

Figure 12 shows the circuit diagram for a rectifier valve where the self-induction P is inserted in the grid circuit of the rectifier in series with the leak resistance H. The resistance $s$ and the condenser K are inserted in the anode circuit of the rectifier valve. The time constant for the entire rectifier arrangement according to Figure 12 is greater than the time constant for the rectifier according to Fig. 10, provided that the time constant for the anode circuit, i. e. the product K.$s$ be not a small quantity.

In the above an electron valve is supposed to be used for the rectification, but any other type of rectifiers may of course be used, and instead of a mirror any other oscillating sound-recording member may be used, perhaps a vacuum tube on which the rectified current is caused to act in such a manner that the extent of the light or the intensity thereof, in a manner known per se, is varied in accordance with the said current.

In recording sounds in the manner described above a beam of light from a light source L, Figure 3, is in the usual manner concentrated on the mirror $i$ by way of a lens C to form a linear image L' disposed transversely to the axis of vibration of the mirror. The light source L should preferably be linear. If a light source which is not linear is used, a screen provided with a slit is inserted between the light source and the mirror and a linear image of the said slit is then formed on the mirror by means of lens C.

The light rays reflected from the mirror are concentrated on the film F by means of a cylindrical lens B to form a linear light strip L'' on the surface of the film disposed transversely by direction of movement of the film, which movement is indicated by the arrow in Figure 3. The vibrations of the mirror are transferred to the beam of light reflected from the mirror and thereby the recording is performed in a manner known per se.

For the sake of simplicity the optical system for concentrating the light on the film is not shown in Figs. 4 and 5, but a recording device similar to that described in connection with Figure 6 is to be used.

Having now particularly described and ascertained the nature of our said invention and in what manner the same is to be performed, we declare that what we claim is:

1. A system for recording sound photographically on a moving light-sensitive film by directing a beam of light onto the film, varying the average exposure of the film in accordance with the volume of the sounds by rectifying a portion of the microphone currents into which the sound waves are converted for recording purposes, causing the rectified current to control the actuation of the sound recording member so as to vary the mean position about which the beam of light concentrated on the film is oscillated by the action of the microphone currents at a rate which increases for increasing volume of the sound, in which the electric circuit through which the rectified current flows after amplification to act upon the sound recording member, are of such value that the variation of the rectified current at increasing volumes of sound is effected more rapidly than the variation of the volume of the sound, and at decreasing volumes is effected more slowly than the variation of the volume of the sound.

2. An apparatus for producing a photographic sound record of the variable-width type comprising means for directing a beam of light on to a moving film so as to form a transversely disposed narrow strip of light on the film, means actuated by a sound responsive current for varying the length of the strip of light in accordance with the amplitude of the sound, a thermionic tube arranged so that its plate current actuates light varying means, means for applying a biasing potential to the grid of said tube, means actuated by a rectified portion of the sound responsive current for controlling said biasing potential in accordance with the volume of the sound so as to cause the plate current of the tube to vary in accordance with the volume of the sound, the apparatus being so adjusted that the zero line of the sound trace takes up such an initial position relatively to the sound track that, when the plate current attains a zero value, the zero line moves from the said initial position into the center line of the sound track, said apparatus including an oscillograph for directing the beam of light on to the film and for swinging the beam in accordance with the amplitude of the sound, in which the loop of the moving system of the oscillograph is connected in the plate circuit of the thermionic tube in series with two ohmic or inductive resistances, which are arranged one on each side of the loop, with a condenser connected across the said resistances and the loop, in order to prevent current of audible frequencies in the plate circuit from affecting the mean position of the moving system of the oscillograph.

3. A system for recording sounds on a light-sensitive film comprising means for converting the sounds into a varying electrical current, a light source, a mirror oscillated by said current and reflecting a bundle of rays from said light source towards the film, means to concentrate said rays on the surface of the film to form a transversely disposed linear strip of light on same, a rectifier for rectifying a portion of said current, a thermionic amplifier, a wire loop carrying said mirror and inserted in the plate circuit of said amplifier and a resistance inserted in the circuit of the rectified current and connected across the grid circuit of the thermionic amplifier in order that the grid-bias should vary in accordance to the magnitude of the rectified current for the purpose of causing corresponding variations of the plate current of the amplifier, whereby the mean position about which the mirror is oscillated by the influence of the varying current into which the sounds are converted, is altered in dependency of the magnitude of the sound amplitudes so as to cause the zero-line of the recorded sound to be displaced transversely to the film from an initial position at one edge of the film towards the middle of the same at a rate increasing for increasing amplitudes of the recorded sounds the conductivity of the last mentioned circuit being adjusted so as to cause that the variations of the rectified current, corresponding to increasing sound amplitudes, to be effected more quickly, and the variation of the same current corresponding to decreasing amplitudes to be effected more slowly than the variations in the sound amplitudes.

4. A system for recording sounds on a light-sensitive film, comprising means for converting the sounds into a varying electrical current, a light source, means to concentrate a bundle of rays from said light source on the surface of film to form thereon a transversely disposed linear strip of light, means to cause said strip of light to oscillate transversely to the film by the influence of said current, a rectifying valve having a primary circuit connected across a circuit of said varying current and a secondary circuit, a condenser inserted in said seondary circuit, an ohmic resistance connected across the said condenser and adjusted to such value depending on the ohmic resistance of the rectifying valve that the charging of the condenser during the passage of a positive half wave through the rectifier is effected more quickly than the subsequent discharge of the condenser, a thermionic amplifier having a grid circuit including said resistance and a plate circuit including means by which the plate current of the amplifier controlled by the grid-bias of the amplifier and consequently by the charge and discharge of said condenser is caused to shift the mean position about which the strip of light is oscillated more quickly transversely to the film when the amplitudes of the sound increase than when the amplitudes of the sound decrease.

5. A system as defined in claim 4, in which an inductance is connected in series with the ohmic resistance connected across the condenser in the secondary circuit of the rectifier.

6. A system for recording sounds on a light sensitive film comprising means for converting the sounds into a varying electrical current, a light source, means to concentrate a bundle of rays from said light source onto the surface of the film to form thereon a transversely disposed linear strip of light, means to cause said bundle of rays to vary so as to cause the exposure of the film to vary in accordance with the volume of the sound, a rectifier rectifying a portion of said varying electrical current, and a circuit through which the said rectified current influences the sound recording means to cause the said bundle of rays to oscillate dependent on the volume of the sound to be recorded, the electrical constants of at least one of the circuits through which the rectified current acts upon the sound recording member being of such a value that the rate of decrease of the current acting upon the recording means is greater during increase of the sound intensity than the rate of increase of the peak value of the alternating current.

7. A system in accordance with claim 6 in which the conductivity of one of the circuits through which the rectified current is caused to act upon the recording device is so adjusted that the variations of the rectified current corresponding to increasing sound amplitudes are effected more quickly, and the variation of the same current corresponding to decreasing amplitude are effected more slowly than the variations in the sound amplitudes.

8. A system according to claim 6 in which said rectifier is a valve by which a portion of the sound-responsive current is rectified, said valve having a plate circuit including an ohmic resistance and a smoothing condenser connected across said resistance, and an inductance connected in series with said resistance in order to flatten out the first portion of the discharged characteristic of the said condenser.

9. A system for recording sounds on a light sensitive film, comprising means for converting sounds into an alternating current, a light source, means to concentrate a beam of light from said light source onto the surface of the film so as to form thereon a transversely disposed linear strip of light, means to cause the exposure of the film to vary in accordance with the alternating current, a rectifier rectifying a portion of said alternating current, and a smoothing circuit through which the rectified current influences said sound recording means to cause the said exposure to vary dependent on the volume of sound, the electrical constants of the rectifier and said smoothing circuit being so adjusted that the rate of increase of the rectified current during increase of the sound intensity is greater than the rate of increase of the peak value of the alternating current.

10. A system for recording sounds on a light sensitive film comprising means for converting sounds into an alternating current, a light source, means to concentrate a beam of light from said light source onto the surface of the film so as to form thereon a transversely disposed linear strip of light, means to cause the exposure of the film to vary in accordance with the alternating current, a rectifier rectifying a portion of said alternating current, and a smoothing circuit through which the rectified current influences said sound recording means to cause the exposure to vary dependent on the volume of sound, the electrical constants of the rectifier and said smoothing circuit being so adjusted that the rate of decrease of the rectified current during decrease of the sound intensity is less than the rate of decrease of the peak value of the alternating current.

11. In a photographic sound recording system including a moving film, a source of light and a light flux controlling element, sound modulated alternating current means for controlling said element to expose the film in accordance with the amplitude of each individual sound wave, and biasing means for controlling said element to vary the average exposure of the film between a predetermined lower and a predetermined upper limit.

12. The recording system according to claim 11 and in which the lower limit is approximately zero.

13. The recording system according to claim 11 and in which the upper limit is substantially midway between zero and full exposure.

14. The recording system according to claim 11 and in which a source of unidirectional current applies a constant bias on said element, and means for applying a rectified portion of the alternating current to reduce the bias substantially to zero as the sound volume increases from zero to a predetermined maximum.

15. The method of producing a photographic sound record comprising the following steps: directing a light beam onto a moving film so that it will receive a transversely disposed extremely narrow strip of light, variably exposing the film in accordance with the amplitude of each individual sound wave, controlling the light impinging on the film to vary the average exposure of the film as the volume of the sound to be recorded varies but more rapidly than the varying exposure corresponding to the individual sound waves when the sound volume increases and more slowly than said varying exposure when it decreases, and holding the variations of the average exposure between predetermined lower and upper limits.

ARNOLD POULSEN.
AXEL CARL GEORG PETERSEN.